Patented Sept. 5, 1933

1,925,367

UNITED STATES PATENT OFFICE 1,925,367

HYDROLYSIS OF CHLORINATED DIPHENYLS

Charles F. Booth, Anniston, Ala., assignor to Swann Research, Incorporated, a corporation of Alabama No Drawing. Application April 21, 1930
Serial No. 446,192

1 Claim. (Cl. 260—154)

It has recently been disclosed that phenol can be produced by passing monochlor benzol and steam in the vapor phase through a porous silica catalyst having a high order of catalytic activity. (Lloyd and Kennedy, U. S. Patent 1,733,327.)

I have now found that the hydroxydiphenyls can be produced by passing the vapor of the appropriate chlorodiphenyl and steam over a porous silica catalyst. While some reaction is caused by employing a porous silica catalyst, we have found that when the catalyst is impregnated with copper or a copper compound, say copper oxide, a much better yield of the hydroxy compound is obtained.

In carrying out the reaction by the preferred method, I heat for example the 4-chlorodiphenyl to the boiling point and mix the vapors of this substance with steam. The mixed vapors are then passed through a highly active silica bed made as indicated, which bed is maintained at a temperature between 525 and 600° C. The catalyst bed may be contained in and heated by a suitable furnace or the vapors may first be preheated and then passed into the catalyst bed. The vapors issuing from the catalyst chamber are found to contain the vapor of hydroxydiphenyl and hydrochloric acid, together with steam and unchanged chlorodiphenyl. Since these vapors contain a considerable amount of heat, they may be passed through a heat exchanger and part of the heat supplied to the incoming vapors. The vapors are then condensed and the products of the reaction separated by distillation or otherwise, the unchanged chlorodiphenyl being returned to be reused.

In order to maintain the catalytic activity of the silica catalyst at a high degree, the vapors to be subjected to catalysis may first be passed over metallic copper or copper oxide before being passed over the catalyst, which treatment seems to vaporize a small amount of a volatile copper salt which is carried into and increases the activity of the silica.

In place of 4-chlorodiphenyl, I may employ the 2-chlorodiphenyl and obtain the 2-hydroxydiphenyl. In the same way I may make the 4,4'-dihydroxydiphenyl by employing as the starting material 4,4'-dichlorodiphenyl.

In regard to the amount of steam used, I have found that the proportion used may vary considerably from that demanded by the stoichiometrical proportions. In fact I have found that by employing proportions of steam greater than that stoichiometrically required, I obtain better yields on hydrolysis.

I have also found that the other halogen derivatives of diphenyl, such, for example, as bromdiphenyl, work equally well for this purpose, and, therefore, are to be considered within the scope of this invention.

What I claim is:

Process of producing 4-hydroxydiphenyl comprising passing vaporized 4-chlorodiphenyl and steam over a silica catalyst containing copper oxide and recovering the hydroxydiphenyl from the reaction product.

CHARLES F. BOOTH.